(12) United States Patent  
Alasti et al.

(10) Patent No.: US 12,395,909 B2
(45) Date of Patent: Aug. 19, 2025

(54) EFFICIENT HANDOVER IN 5G NETWORKS

(71) Applicant: DISH Wireless L.L.C., Englewood, CO (US)

(72) Inventors: Mehdi Alasti, Arlington, VA (US); Khalid W. Al-Mufti, Sterling, VA (US); Siddhartha Chenumolu, Broadlands, VA (US)

(73) Assignee: DISH WIRELESS L.L.C., Englewood, CO (US)

( * ) Notice: Subject to any disclaimer, the term of this patent is extended or adjusted under 35 U.S.C. 154(b) by 366 days.

(21) Appl. No.: 18/188,342

(22) Filed: Mar. 22, 2023

(65) Prior Publication Data

US 2024/0323785 A1   Sep. 26, 2024

(51) Int. Cl.
*H04W 36/10*   (2009.01)
*H04W 36/00*   (2009.01)

(52) U.S. Cl.
CPC ....... *H04W 36/10* (2013.01); *H04W 36/0033* (2013.01)

(58) Field of Classification Search
CPC . H04W 36/10; H04W 36/0033; H04W 36/08; H04W 88/085
USPC ....................................................... 370/331
See application file for complete search history.

(56) References Cited

U.S. PATENT DOCUMENTS

| | | | | |
|---|---|---|---|---|
| 8,509,180 B2 * | 8/2013 | Maheshwari | ......... | H04W 76/10 370/348 |
| 11,606,248 B2 * | 3/2023 | Majmundar | .......... | H04W 24/02 |
| 12,052,784 B2 * | 7/2024 | Wang | ..................... | H04W 72/56 |
| 12,081,316 B2 * | 9/2024 | Wang | .................... | H04B 7/1851 |
| 12,081,808 B2 * | 9/2024 | Jayawardene | ... | H04N 21/44004 |

(Continued)

FOREIGN PATENT DOCUMENTS

| CA | 3097144 A1 | * | 10/2019 | ............ | H04J 3/1652 |
| CN | 101536579 B | * | 10/2013 | ........ | H04W 12/0017 |

(Continued)

OTHER PUBLICATIONS

International Search Report, dated Jul. 18, 2024, for International Application No. PCT/US2024/020179. (17 pages).

(Continued)

*Primary Examiner* — Mahendra R Patel
(74) *Attorney, Agent, or Firm* — Seed Intellectual Property Law Group LLP

(57) ABSTRACT

Technologies for efficient handover in 5G networks are disclosed. An example method includes responsive to detecting that a user device is located in a geographic area with overlapping 5G coverage from a first gNB and a second gNB and that the user device is moving away from the first gNB's coverage toward the second gNB's coverage, determining to perform a light inter-gNB handover of the user device, and causing execution of the light inter-gNB handover by at least causing a physical switch from a physical CU-CP of the first gNB to a physical CU-CP of the second gNB, a logical switch from a logical CU-UP of the first gNB to a logical CU-UP of the second gNB, a logical switch from a logical DU of the first gNB to a logical DU of the second gBN, and a logical switch from a logical RU of the first gNB to a logical RU of the second gBN, wherein the logical switches are performed without transfer of context data associated with the user device.

22 Claims, 15 Drawing Sheets

(56) References Cited

U.S. PATENT DOCUMENTS

| | | | |
|---|---|---|---|
| 12,113,746 B2* | 10/2024 | Panteleev | H04L 5/0053 |
| 12,120,661 B2* | 10/2024 | He | H04W 72/0446 |
| 2016/0175091 A1* | 6/2016 | Van Heugten | A61F 2/14 |
| | | | 623/6.22 |
| 2019/0342800 A1* | 11/2019 | Sirotkin | H04W 36/02 |
| 2020/0252838 A1* | 8/2020 | Akdeniz | H04W 36/0061 |
| 2021/0368398 A1* | 11/2021 | Sillanpaa | H04W 36/0033 |
| 2022/0104088 A1* | 3/2022 | Byun | H04W 36/0235 |
| 2022/0141894 A1* | 5/2022 | Akl | H04W 40/22 |
| | | | 370/329 |
| 2022/0182905 A1* | 6/2022 | Xu | H04W 36/302 |
| 2023/0116324 A1* | 4/2023 | Eklöf | H04L 41/0806 |
| | | | 370/331 |
| 2023/0239740 A1* | 7/2023 | Palermo | H04W 28/18 |
| | | | 455/456.1 |
| 2023/0336439 A1* | 10/2023 | Trujillo | H04L 45/586 |
| 2023/0388890 A1* | 11/2023 | Talukdar | H04W 36/08 |
| 2024/0267823 A1* | 8/2024 | Pedersen | H04W 36/00838 |
| 2025/0024305 A1* | 1/2025 | Manolakos | H04W 56/001 |
| 2025/0113329 A1* | 4/2025 | Barbu | H04W 64/00 |

FOREIGN PATENT DOCUMENTS

| | | | | |
|---|---|---|---|---|
| CN | 116686380 A | * | 9/2023 | H04W 36/0033 |
| CN | 118715857 A | * | 9/2024 | H04W 68/005 |
| CN | 119072957 A | * | 12/2024 | H04B 7/18506 |
| WO | WO-2019010049 A1 | * | 1/2019 | H04W 28/16 |
| WO | WO-2020197315 A1 | * | 10/2020 | H04L 1/08 |
| WO | WO-2020227154 A1 | * | 11/2020 | H04B 7/0404 |
| WO | WO-2021091315 A1 | * | 5/2021 | H04W 36/0033 |

OTHER PUBLICATIONS

Nokia, Nokia Shanghai Bell, "Discussion on Inter-Donor IAB Node Migration," R3-206287, 3PP TSG-RAN Wg3 Meeting #110-e, Online, Nov. 2-12, 2021. (6 pages).

CATT, "Applicability of common F1 interface," R3-191582, 3GPP TSG-RAN WG3 #103bis, Agenda item 9.3.3, Xi'an, China, Apr. 8-12, 2019. (10 pages).

* cited by examiner

EFFICIENT HANDOVER IN 5G NETWORKS

BACKGROUND

In telecommunications, 5G is the fifth-generation technology standard for broadband cellular networks. 5G networks are cellular networks, in which the service area is divided into small geographical areas called cells.

As the use of smart phones and other user devices in 5G networks has increased, so too has the desire for more reliable, fast, and continuous transmission of content. In an effort to improve the content transmission, networks continue to improve with faster speeds and increased bandwidth. The increase in the number of user devices, however, has also resulted in increased cellular traffic. As devices move around, cells need to handover service of the device to other cells. There remains a need for more efficient handover technologies to minimize service interruption and improve service quality.

BRIEF SUMMARY

In some embodiments, a computer-implemented method for efficient handover in a Fifth Generation (5G) communications network includes responsive to detecting that a user device is located in a geographic area with overlapping 5G coverage from a first Next Generation NodeB (gNB) and a second gNB and that the user device is moving away from the first gNB's coverage toward the second gNB's coverage, determining to perform a light inter-gNB handover of the user device. The method also includes causing execution of the light inter-gNB handover by at least causing a physical switch from a physical Central Unit Control Plane (CU-CP) of the first gNB to a physical CU-CP of the second gNB, a logical switch from a logical Central Unit User Plane (CU-UP) of the first gNB to a logical CU-UP of the second gNB, a logical switch from a logical Distributed Unit (DU) of the first gNB to a logical DU of the second gBN, and a logical switch from a logical Remote Unit (RU) of the first gNB to a logical RU of the second gBN, wherein the logical switches are performed without transfer of context data associated with the user device.

In some embodiments, both the logical CU-UP of the first gNB and the logical CU-UP of the second gNB are implemented within a physical CU-UP, both the logical DU of the first gNB and the logical DU of the second gNB are implemented within a physical DU, and both the logical RU of the first gNB and the logical RU of the second gNB are implemented within a physical RU. In some embodiments, the physical CU-UP stores at least a portion of the context data associated with the user device, the physical DU stores at least a portion of the context data associated with the user device, and the physical RU stores at least a portion of the context data associated with the user device.

In some embodiments, the logical switch from the logical CU-UP of the first gNB to the logical CU-UP of the second gNB is performed, at least in part, by changing an association of at least a portion of the context information associated with the user device from the logical CU-UP of the first gNB to the logical CU-UP of the second gNB, the logical switch from the logical DU of the first gNB to the logical DU of the second gNB is performed, at least in part, by changing an association of at least a portion of the context information associated with the user device from the logical DU of the first gNB to the logical DU of the second gNB, and the logical switch from the logical RU of the first gNB to the logical RU of the second gNB is performed, at least in part, by changing an association of at least a portion of the context information associated with the user device from the logical RU of the first gNB to the logical RU of the second gNB. In some embodiments, the changing of associations is implemented by at least one of and index change, pointer change, address change, or identifier change.

In some embodiments, prior to causing execution of the light inter-gNB handover, a DU switch is performed to transfer at least a portion of the context information associated with the user device from another physical DU of the first gNB to the logical DU of the first gNB. In some embodiments, prior to causing execution of the light inter-gNB handover, a CU-UP switch is performed to transfer at least a portion of the context information associated with the user device from another physical CU-UP of the first gNB to the logical CU-UP of the first gNB.

In some embodiments, a system for efficient handover in a Fifth Generation (5G) communications network includes at least one memory that stores computer executable instructions and at least one processor that executes the computer executable instructions to cause actions to be performed. The actions include responsive to detecting that a user device is located in a geographic area with overlapping 5G coverage from a first Next Generation NodeB (gNB) and a second gNB and that the user device is moving away from the first gNB's coverage toward the second gNB's coverage, determining to perform a light inter-gNB handover of the user device, and causing execution of the light inter-gNB handover by at least causing a physical switch from a physical Central Unit Control Plane (CU-CP) of the first gNB to a physical CU-CP of the second gNB and at least one of: (a) a logical switch from a logical Central Unit User Plane (CU-UP) of the first gNB to a logical CU-UP of the second gNB or (b) a logical switch from a logical Distributed Unit (DU) of the first gNB to a logical DU of the second gBN, wherein the logical switches are performed without transfer of context data associated with the user device.

In some embodiments, both the logical CU-UP of the first gNB and the logical CU-UP of the second gNB are implemented within a physical CU-UP, and both the logical DU of the first gNB and the logical DU of the second gNB are implemented within a physical DU. In some embodiments, the physical CU-UP stores at least a first portion of the context data associated with the user device, and the physical DU stores at least a second portion of the context data associated with the user device. In some embodiments, the at least one of the logical switches is performed by at least changing an association of at least the first portion of the context information associated with the user device within the physical CU-UP or changing an association of at least the second portion of the context information associated with the user device within the physical DU. In some embodiments, at least one of the changing of associations is implemented by at least one of an index change, pointer change, address change, or identifier change.

In some embodiments, subsequent to causing execution of the light inter-gNB handover, a DU switch is performed to transfer at least a portion of the context information associated with the user device from the logical DU of the second gNB to another physical DU of the second gNB. In some embodiments, subsequent to causing execution of the light inter-gNB handover, a CU-UP switch is performed to transfer at least a portion of the context information associated with the user device from the logical CU-UP of the second gNB to another physical CU-UP of the second gNB.

In some embodiments, a non-transitory computer-readable medium stores contents that, when executed by one or more processors, cause the one or more processors to perform actions. The actions include responsive to detecting that a user device is located in a geographic area with overlapping 5G coverage from a first Next Generation NodeB (gNB) and a second gNB and that the user device is moving away from the first gNB's coverage toward the second gNB's coverage, determining to perform a light inter-gNB handover of the user device, and causing execution of the light inter-gNB handover by at least causing a physical switch from a physical Central Unit Control Plane (CU-CP) of the first gNB to a physical CU-CP of the second gNB and at least one of: (a) a logical switch from a logical Central Unit User Plane (CU-UP) of the first gNB to a logical CU-UP of the second gNB or (b) a logical switch from a logical Distributed Unit (DU) of the first gNB to a logical DU of the second gBN, wherein the logical switches are performed without transfer of context data associated with the user device.

In some embodiments, both the logical CU-UP of the first gNB and the logical CU-UP of the second gNB are implemented within a physical CU-UP, and both the logical DU of the first gNB and the logical DU of the second gNB are implemented within a physical DU. In some embodiments, the physical CU-UP is shared between two or more gNBs and the physical DU is shared between two or more gNBs. In some embodiments, the at least one of the logical switches is performed by at least changing an association of at least the first portion of the context information associated with the user device within the physical CU-UP or changing an association of at least the second portion of the context information associated with the user device within the physical DU.

In some embodiments, subsequent to causing execution of the light inter-gNB handover, at least a portion of the context information associated with the user device is transferred from the logical DU of the second gNB to another physical DU of the second gNB. In some embodiments, prior to causing execution of the light inter-gNB handover, at least a portion of the context information associated with the user device is transferred from another physical CU-UP of the first gNB to the logical CU-UP of the first gNB.

DETAILED DESCRIPTION

Figure 1:
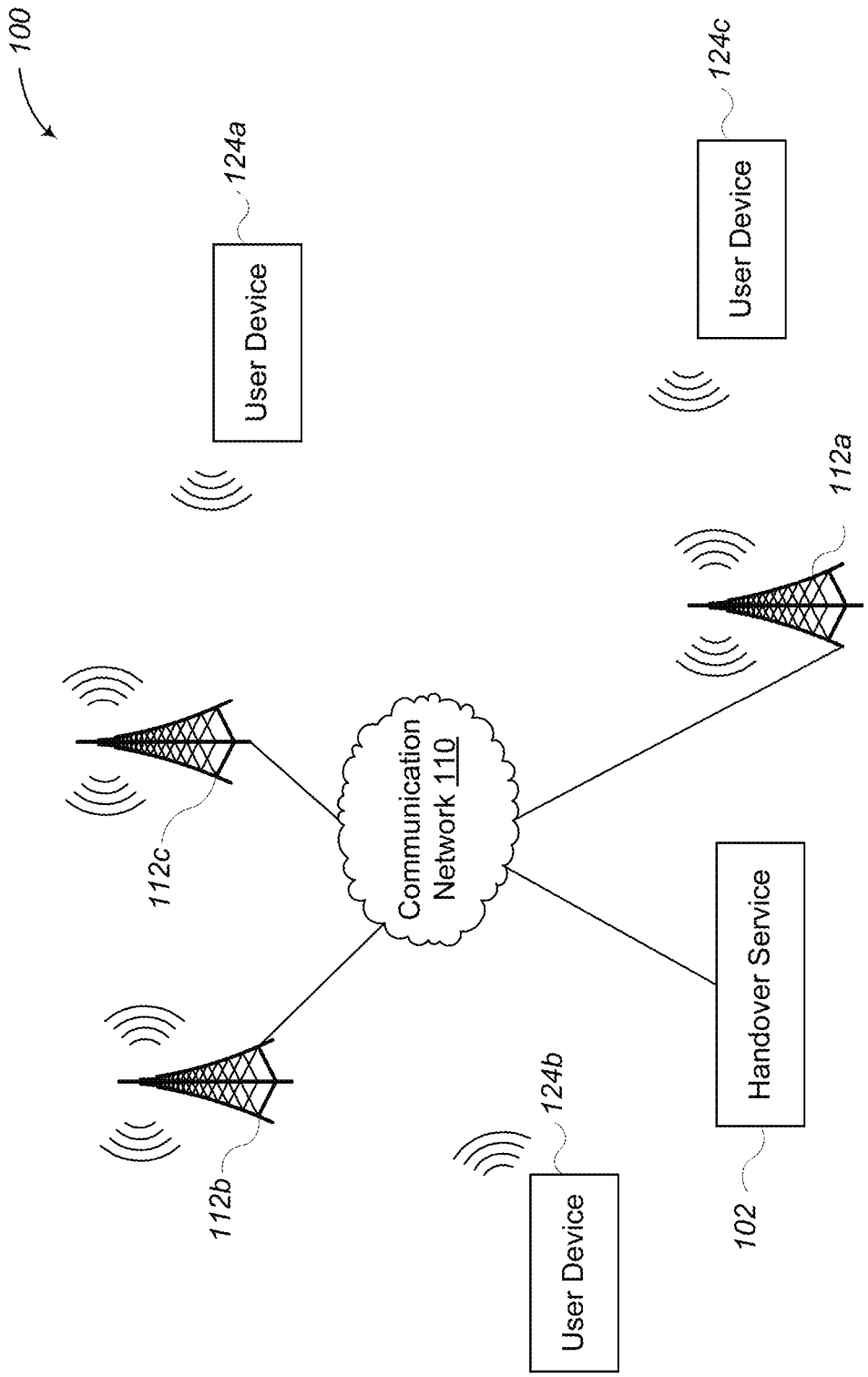
FIG. 1 illustrates a context diagram of an environment for efficient handover management in a 5G communications network in accordance with embodiments described herein.

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the environment, have not been shown or described in order to avoid unnecessarily obscuring descriptions of the embodiments. Additionally, the various embodiments may be methods, systems, media, or devices. Accordingly, the various embodiments may combine software and hardware aspects. The following list includes certain acronyms used herein:

3GPP: Third Generation Partnership Project.
5G: Fifth Generation.
RAN: Radio Access Network.
O-RAN: Open RAN.
gNB: Next Generation NodeB.
API: Application Programming Interface.
CU: Central Unit.
CU-CP: CU Control Plane.
CU-UP: CU User Plane.
DU: Distributed Unit.
RU: Remote Unit.
IP: Internet Protocol.
NEF: Network Exposure Function.
UE: User Equipment (e.g., cell phone, smart phone, Internet of Things (IoT) device, or other devices connected to a communication network).

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

References to the term "set" (e.g., "a set of items"), as used herein, unless otherwise noted or contradicted by context, is to be construed as a nonempty collection comprising one or more members or instances.

References to the term "subset" (e.g., "a subset of the set of items"), as used herein, unless otherwise noted or contradicted by context, is to be construed as a nonempty collection comprising one or more members or instances of a set or plurality of members or instances.

Moreover, the term "subset," as used herein, refers to a proper subset, which is a collection of one or more members or instances that are collectively smaller in number than the set or plurality of which the subset is drawn. For instance, a subset of a set of ten items will have less than ten items and at least one item.

FIG. 1 illustrates a context diagram of an environment 100 for efficient handover management in a 5G communications network in accordance with embodiments described herein. Environment 100 includes a plurality of cells 112a-112c (e.g., associated with individual gNBs), a plurality of user devices 124a-124c, a handover service 102, and a communication network 110. Illustratively, the cells 112a-

112c correspond to cell sites (e.g., cellular towers of gNBs) that together implement a 5G cellular communications network. The cells 112a-112c may include or be in communication with base stations, radio back haul equipment, antennas, or other devices, which are not illustrated for case of discussion.

Each cell 112 provides 5G compatible cellular communications over one or more coverage areas. The coverage area(s) of each cell 112 may vary depending on the elevation antenna of the cell, the height of the antenna of the cell above the ground, the electrical tilt of the antenna, the transmit power utilized by the cell, or other capabilities that can be different from one type of cell to another or from one type of hardware to another. Although embodiments are directed to 5G cellular communications, embodiments are not so limited and other types of cellular communications technology may also be utilized or implemented. In various embodiments, the cells 112a-112c may communicate with each other via the communication network 110. Communication network 110 includes one or more wired or wireless networks, which may include a series of smaller or private connected networks that carry information between the cells 112a-112c.

The user devices 124a-124c are computing devices that receive and transmit cellular communication messages with the cells 112a-112c. e.g., via antennas or other means. Examples of user devices 124a-124c may include, but are not limited to, mobile devices, smartphones, tablets, cellular-enabled laptop computers, or other UE or computing devices that can communicate with a 5G cellular network.

In various embodiments, the handover service 102 can include one or more computing devices for performing the handover functions described herein. The handover service 102 can interface or otherwise communicate with multiple elements (e.g., CU, DU, RU, UE, or the like) of the 5G network, via the communication network 110 or by other applicable means. Some of those interfaces may be standard. The interface to core elements of the 5G network may be direct or they may leverage an external API gateway. The handover service 102 can also interface or otherwise communicate with systems or devices external to the communication network 110.

The above description of the environment 100 and the various systems, networks, devices, and components therein is intended as a broad, non-limiting overview of an example environment in which various embodiments of the presently disclosed technology may be implemented. FIG. 1 illustrates just one example of an operating environment, and the various embodiments discussed herein are not limited to such environments. In particular, the environment 100 may contain other devices, systems and/or media not specifically described herein.

In the O-RAN disaggregated architecture, a gNB is split into CU (CU-CP, CU-UPs), DUs, and RUs (see, e.g., 3GPP TS 38.401 and O-RAN.WG1.O-RAN-Architecture-Description-v06.00). A gNB may include a single CU-CP, multiple CU-UPs, multiple DUs, and multiple RUs. Notably, each DU is connected to ONLY one CU-CP, and each CU-UP is connected to ONLY one CU-CP.

More specifically, a gNB includes "one" CU-CP, "N" CU-UPS, "M" DUs, "K" RUS, the F1-U interfaces (an N×M matrix F1), the eCPRI interfaces (an M×K matrix C). This can be expressed as, for the ith gNB, gNBi={CU-CPi, {CU-UPi, 1, . . . , CU-UPi, N}, {DUi, 1, . . . , DUi, M}, {RUi, 1, . . . , RUi, K}, F1i N×M, Ci M×K}. Based on the current 3GPP architecture, the intersection of two different gNBs is always "NULL." In other words, no CU-UPs or DUs or RUs are shared between two different gNBs. At least due to the reasons stated above, an inter gNB handover in accordance with the O-RAN disaggregated architecture involves complexities contributed by multiple bearer context data transfers between gNBs (and their different elements).

FIGS. 2a-2l illustrate an example implementation of efficient handovers in accordance with the O-RAN disaggregated architecture.

In accordance with various embodiments, a physical CU-UP (e.g., a computing node or system) can implement one or multiple logical CU-UPs (L-CU-UPs), as individual processes, threads, virtual machines, or the like. In some embodiments, a physical CU-UP that is not mapped to the border footprints (RUs) of a gNB includes ONLY one L-CU-UP, and can be simply referred to as a CU-UP. In some embodiments, a physical CU-UP that is not mapped to the border footprints of a gNB includes two or more L-CU-UPs. A physical CU-UP that is mapped to the border footprints (RUs) of two or more gNBs (e.g., serving a geographic area with overlapping coverage from two or more gNBs) can have two or more L-CU-UPs, each L-CU-UP connected to ONLY one CU-CP of the corresponding gNB; that is, an L-CU-UP is connected to ONLY one CU-CP (e.g., via E1 interface).

Similarly, a physical DU (e.g., a computing node or system) can implement one or multiple logical DUs (L-DUs), as individual processes, threads, virtual machines, or the like. In some embodiments, a physical DU that is not mapped to the border footprints (RUs) of a gNB includes ONLY one L-DU, and can be simply referred to as a DU. In some embodiments, a physical DU that is not mapped to the border footprints of a gNB includes two or more L-DUs. A physical DU that is mapped to the border footprints (RUs) of two or more gNBs (e.g., serving a geographic area with overlapping coverage from two or more gNBs) can have two or more L-DUs, each L-DU connected to ONLY one CU-CP of the corresponding gNB; that is, an L-DU is connected to ONLY one CU-CP (e.g., via F1-C interface).

Further, each RU can be connected to only one logical DU or shared between multiple logical DUs. Illustratively, a shared RU can use multiple virtual cell IDs (v-CIDs) to map to different DUs or logical DUs.

As such, while no logical nodes are shared between any two different gNBs, since a physical node (e.g., CU-UP or DU) can include multiple logical nodes (e.g., L-CU-UPs or L-DUs), two or more different gNBs can share one or more physical nodes (e.g., CU-UPs or DUs).

When a physical node is shared between two or more gNBs, some steps in the inter gNB Xn handover process can be lighter and more efficient. For example, if a physical CU-UP is shared between two gNBs (e.g., via a physical CU-UP implementing two L-CU-UPs), the bearers and their context for connected user device(s) already exist in the physical CU-UP (e.g., being stored in a memory or other data storage of the physical CU-UP) and therefore minimize data transfer or function change.

As another example, if a physical DU is shared between two gNBs (e.g., via a physical DU implementing two L-DUs), the F1 UE context set up procedure will be lighter that minimizes any data transfer or function change. Illustratively, an index can be used to define or implement L-CU-UPs and L-DUs (e.g., CU-UP-index=1 refers to L-CU-UP1 and CU-UP-index=2 refers to L-CU-UP2; DU-index=1 refers to L-DU1 and DU-index=2 refers to L-DU2), so that a change of index performed by the physical DU can accomplish the F1 UE context set up procedure without actual context transfer.

In some embodiments, the Rel-16 NR Conditional Handover (e.g., along with Rel-18 NR AI/ML) can be used to let UE to initiate and finish a handover between two gNBs (e.g., by causing an intra-gNB pre-transition handover within the source gNB and an intra-gNB post-transition handover within target gNB). In some embodiments, same or similar handover mechanism(s) can be used for changing the CU-UP (L-CU-UP) with the same DU (L-DU) and RU.

Figure 2A:
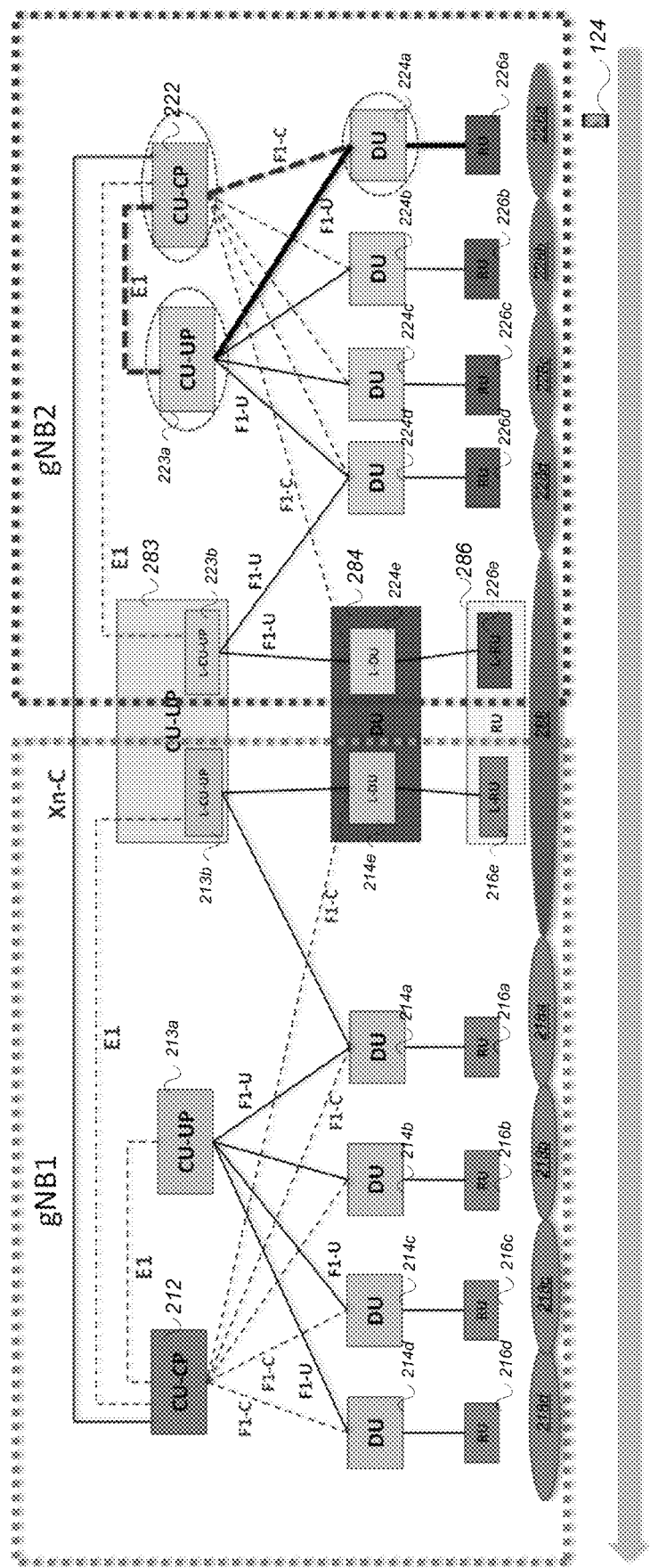
FIGS. 2a-2l illustrate an example implementation of efficient handovers in accordance with the O-RAN disaggregated architecture.

With reference to FIGS. 2a-2l, a user device 124 is moving from coverage areas of gNB2 to coverage areas of gNB1. More specifically, as illustrated in FIG. 2a, the user device 124 is detected as located in coverage area 228a and moving toward coverage area 228b. The coverage area 228a is served by CU-CP 222, CU-UP 223a, DU 224a and RU 226a of gNB2, and the coverage area 228b is served by CU-CP 222, CU-UP 223a, DU 224b and RU 226b of gNB2. In response to the detected location and movement of the user device 124, an intra-gNB handover is determined as an applicable action and the relevant handover process (e.g., relevant network function elements and their actions) is identified.

Figure 2B:
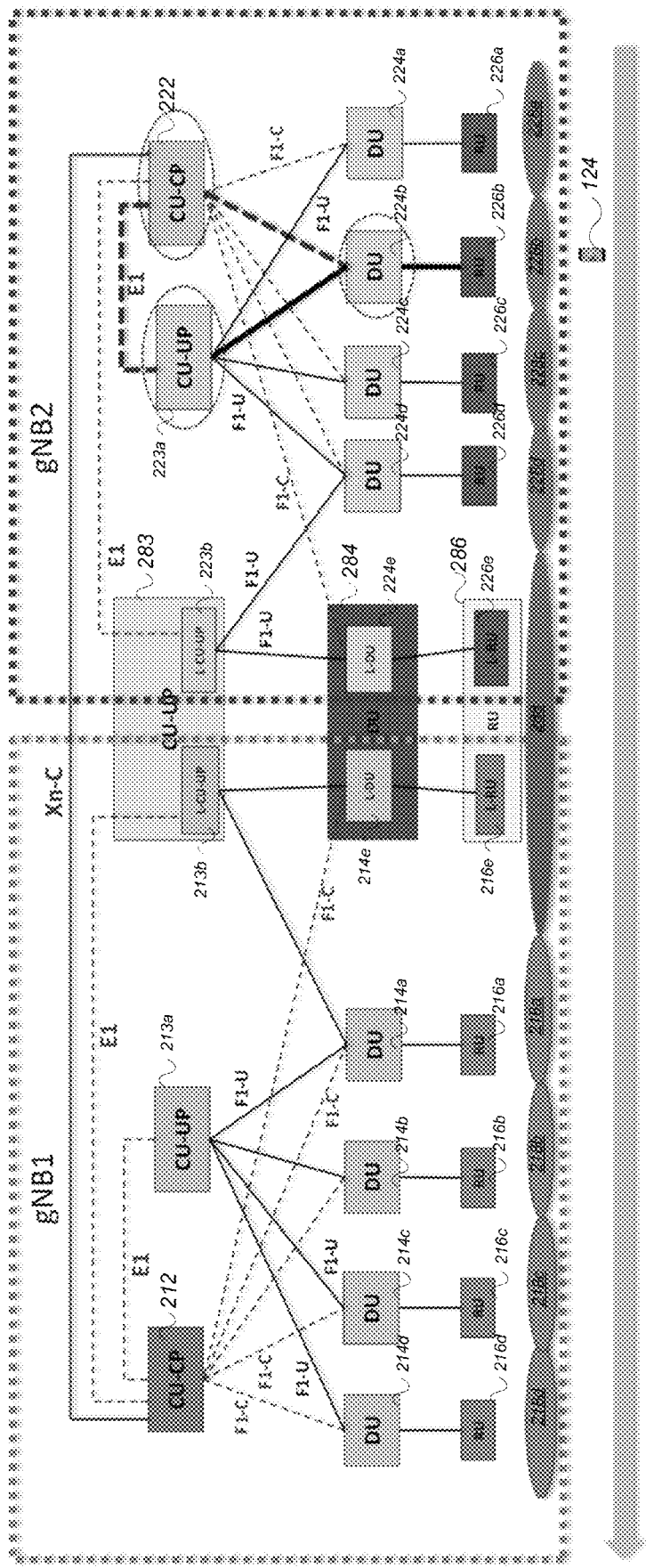

As illustrated in FIG. 2b, in executing the intra-gNB handover, a DU switch is performed to switch context information of user device 124 from DU 224a (physical or logical) to DU 224b (physical or logical), including establishing and terminating corresponding F1-C and F1-U interface connections. The handover involves the change of only one network function element: DU.

Here, the user device 124 is detected as located in coverage area 228b and moving toward coverage area 228c. The coverage area 228b is served by CU-CP 222, CU-UP 223a, DU 224b and RU 226b of gNB2, and the coverage area 228c is served by CU-CP 222, CU-UP 223a, DU 224c and RU 226c of gNB2. In response to the detected location and movement of the user device 124, an intra-gNB handover is determined as an applicable action and the relevant handover process (e.g., relevant network function elements and their actions) is identified.

Figure 2C:
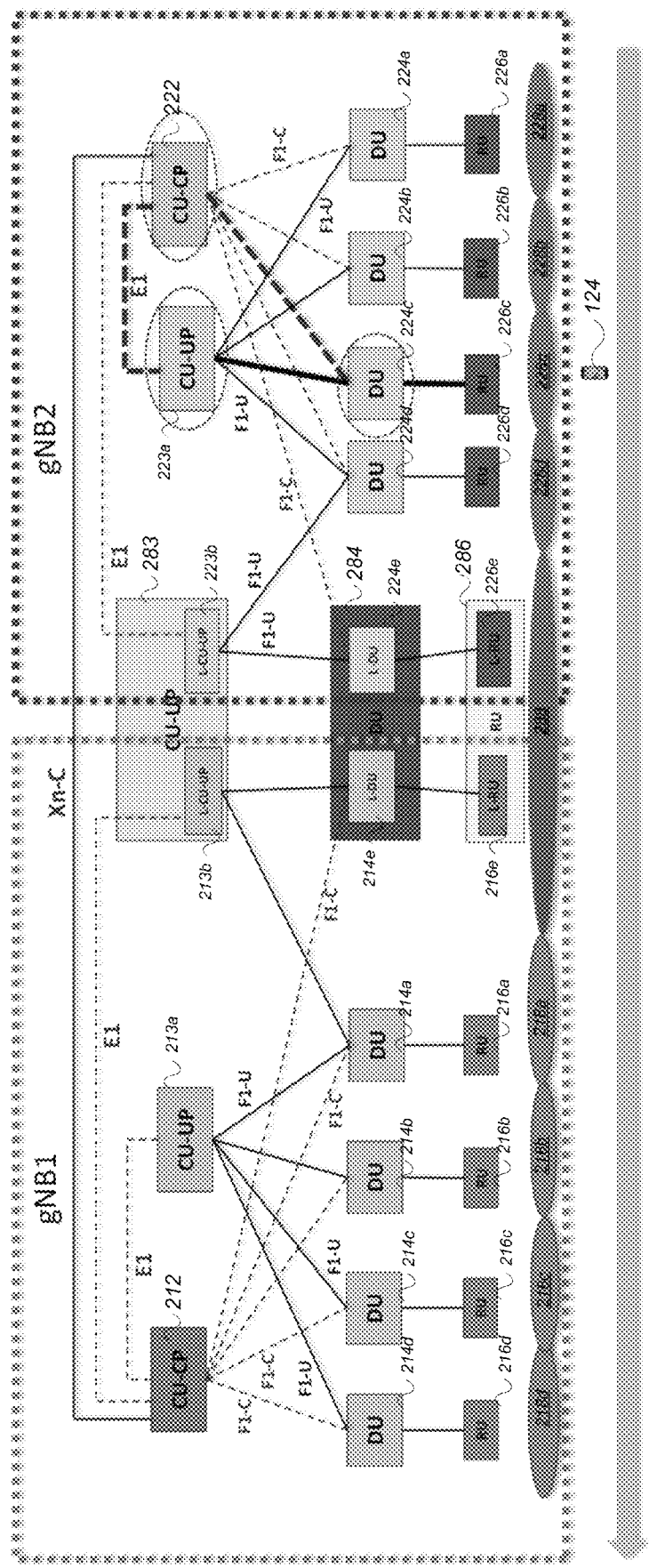

As illustrated in FIG. 2c, in executing the intra-gNB handover, a DU switch is performed to switch context information of user device 124 from DU 224b (physical or logical) to DU 224c (physical or logical), including establishing and terminating corresponding F1-C and F1-U interface connections. The handover involves the change of only one network function element: DU.

Here, the user device 124 is detected as located in coverage area 228c and moving toward coverage area 228d. The coverage area 228c is served by CU-CP 222, CU-UP 223a, DU 224c and RU 226c of gNB2, and the coverage area 228d is served by CU-CP 222, CU-UP 223a or L-CU-UP 223b, DU 224d and RU 226d of gNB2. In response to the detected location and movement of the user device 124, an intra-gNB handover is determined as an applicable action and the relevant handover process (e.g., relevant network function elements and their actions) is identified.

Figure 2D:
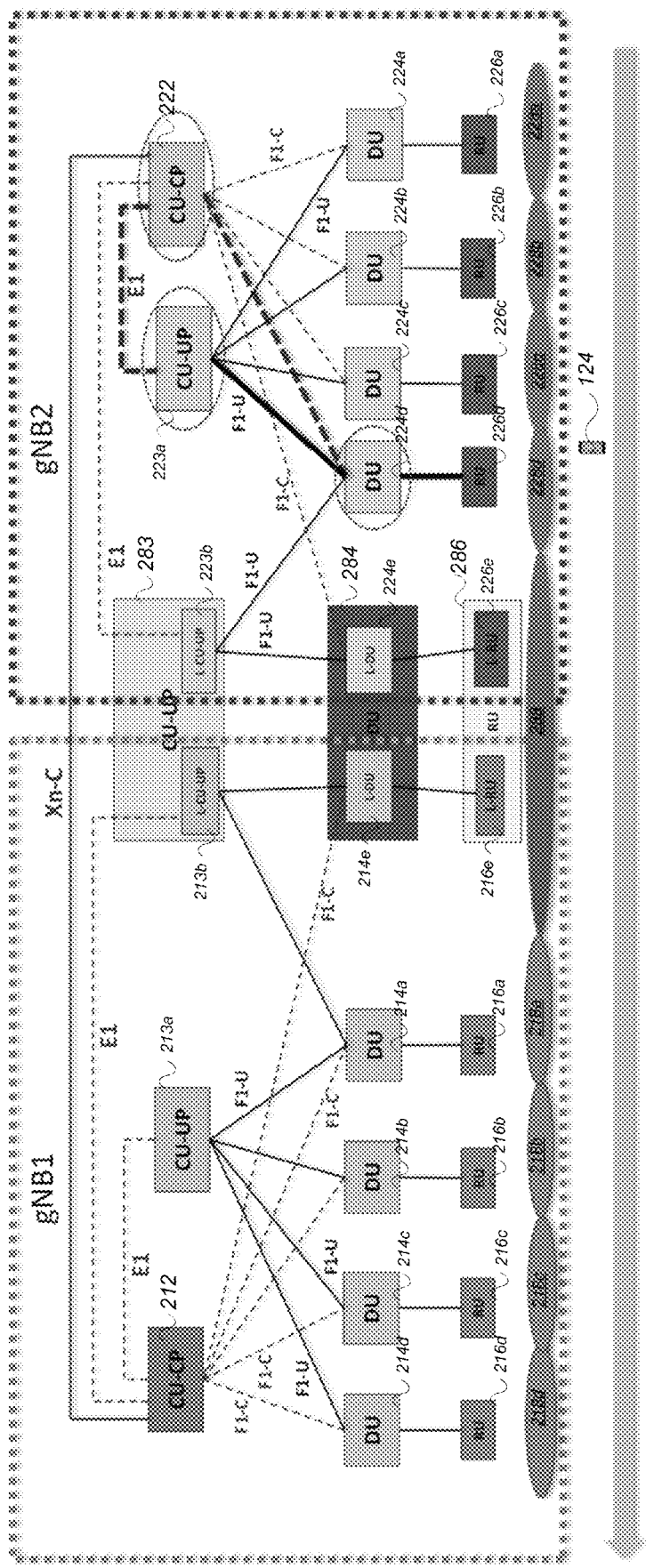

As illustrated in FIG. 2d, in executing the intra-gNB handover, a DU switch is performed to switch context information of user device 124 from DU 224c (physical or logical) to DU 224d (physical or logical), including establishing and terminating corresponding F1-C and F1-U interface connections. Although DU 214d is connected to or otherwise shared by both CU-UP 223a and L-CU-UP 233b, and CU-CP 222 is also connected to or otherwise shared by both CU-UP 223a and L-CU-UP 233b, to ensure the handover involves the change of only one network function element (DU), no switch or context transfer is performed between CU-UP 223a and L-CU-UP 233b for the intra-gNB handover of user device 124.

Here, the user device 124 is detected as located in coverage area 228d and moving toward coverage area 288. The coverage area 228d is served by CU-CP 222, CU-UP 223a or L-CU-UP 223b, DU 224d and RU 226d of gNB2. The coverage area 288 has overlapping coverage from both gNB1 and gNB2: its gNB2 coverage is served by CU-CP 222, L-CU-UP 223b, L-DU 224e and L-RU 226c of gNB2, and its gNB1 coverage is served by CU-CP 212, L-CU-UP 213b, L-DU 214e and L-RU 216e of gNB1. In response to the detected location and movement of the user device 124, an intra-gNB pre-transition handover is determined as an applicable action and the relevant handover process (e.g., relevant network function elements and their actions) is identified.

Figure 2E:
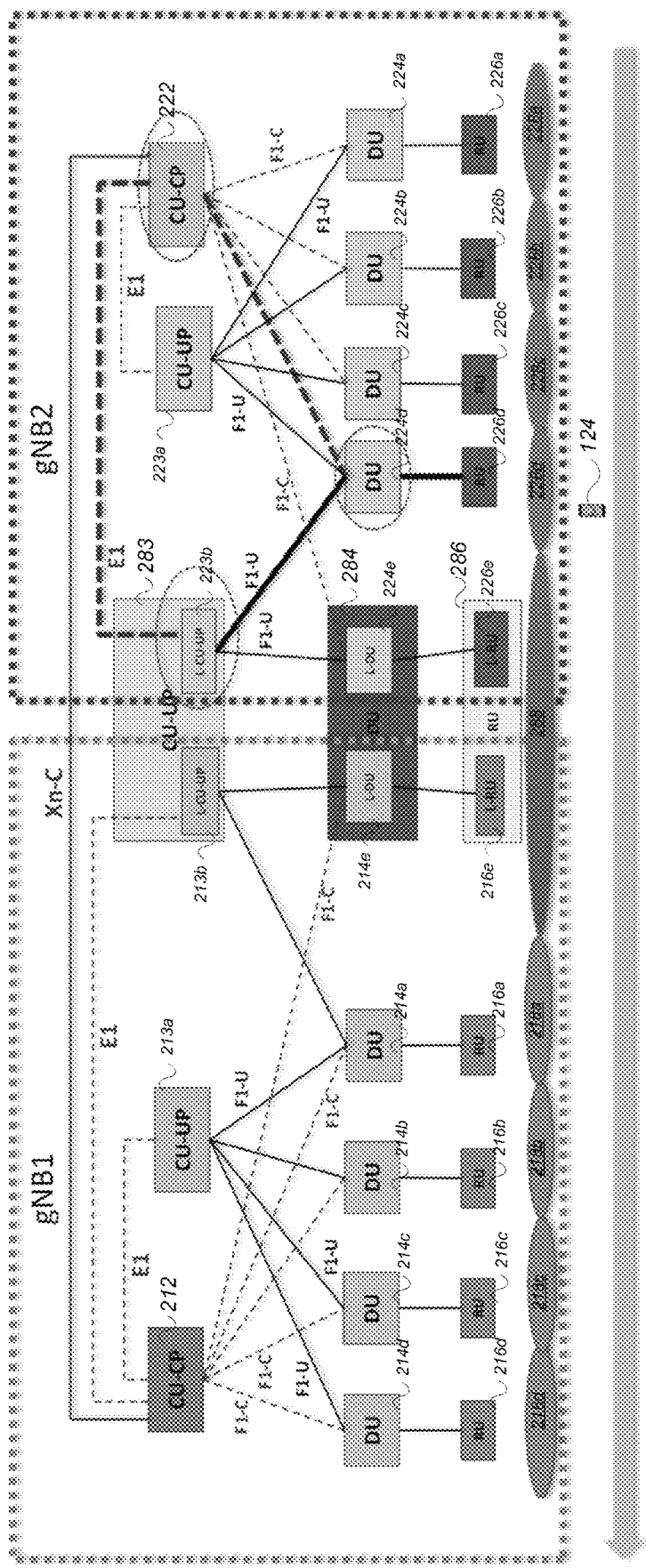

As illustrated in FIG. 2e, in executing the intra-gNB pre-transition handover, a CU-UP switch is performed to switch context information of user device 124 from CU-UP 223a (physical or logical) to L-CU-UP 223b, including establishing and terminating corresponding F1-U and E1 interface connections. The handover involves the change of only one network function element: CU-UP.

Here, the user device 124 is detected as located close to the edge of coverage area 228d and about to cross into coverage area 288. In response to the detected location and movement of the user device 124, an intra-gNB transition handover is determined as an applicable action and the relevant handover process (e.g., relevant network function elements and their actions) is identified.

Figure 2F:
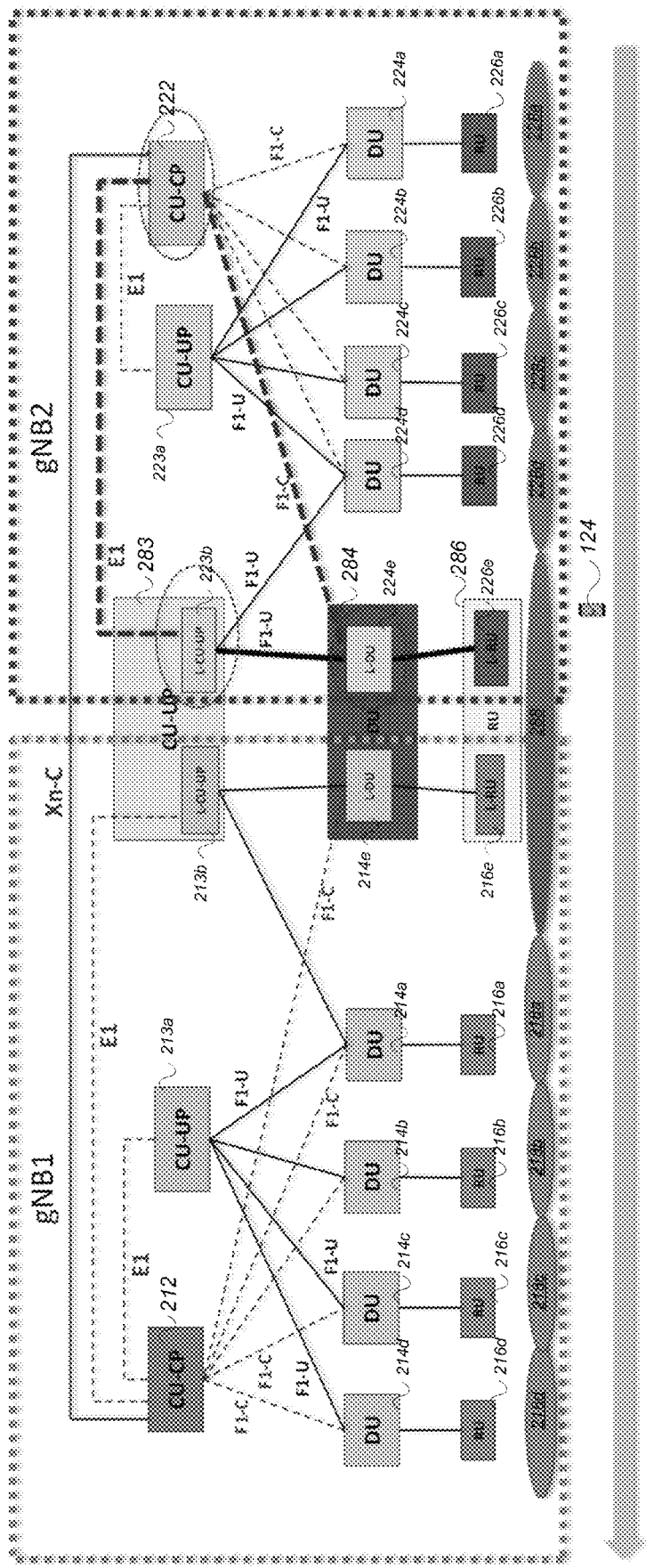

As illustrated in FIG. 2f, in executing the intra-gNB transition handover, a DU switch is performed to switch context information of user device 124 from DU 224d (physical or logical) to L-DU 224e, including establishing and terminating corresponding F1-C and F1-U interface connections. The handover involves the change of only one network function element: DU.

Here, the user device 124 is detected as located in coverage area 288 and moving from gNB2 coverage to gNB1 coverage (e.g., coverage area 218a). As described above, the coverage area 288 has overlapping coverage from both gNB1 and gNB2: its gNB2 coverage is served by CU-CP 222, L-CU-UP 223b, L-DU 224e and L-RU 226e of gNB2, and its gNB1 coverage is served by CU-CP 212, L-CU-UP 213b, L-DU 214e and L-RU 216e of gNB1. In response to the detected location and movement of the user device 124, a light inter-gNB handover is determined as an applicable action and the relevant handover process (e.g., relevant network function elements and their actions) is identified.

Figure 2G:
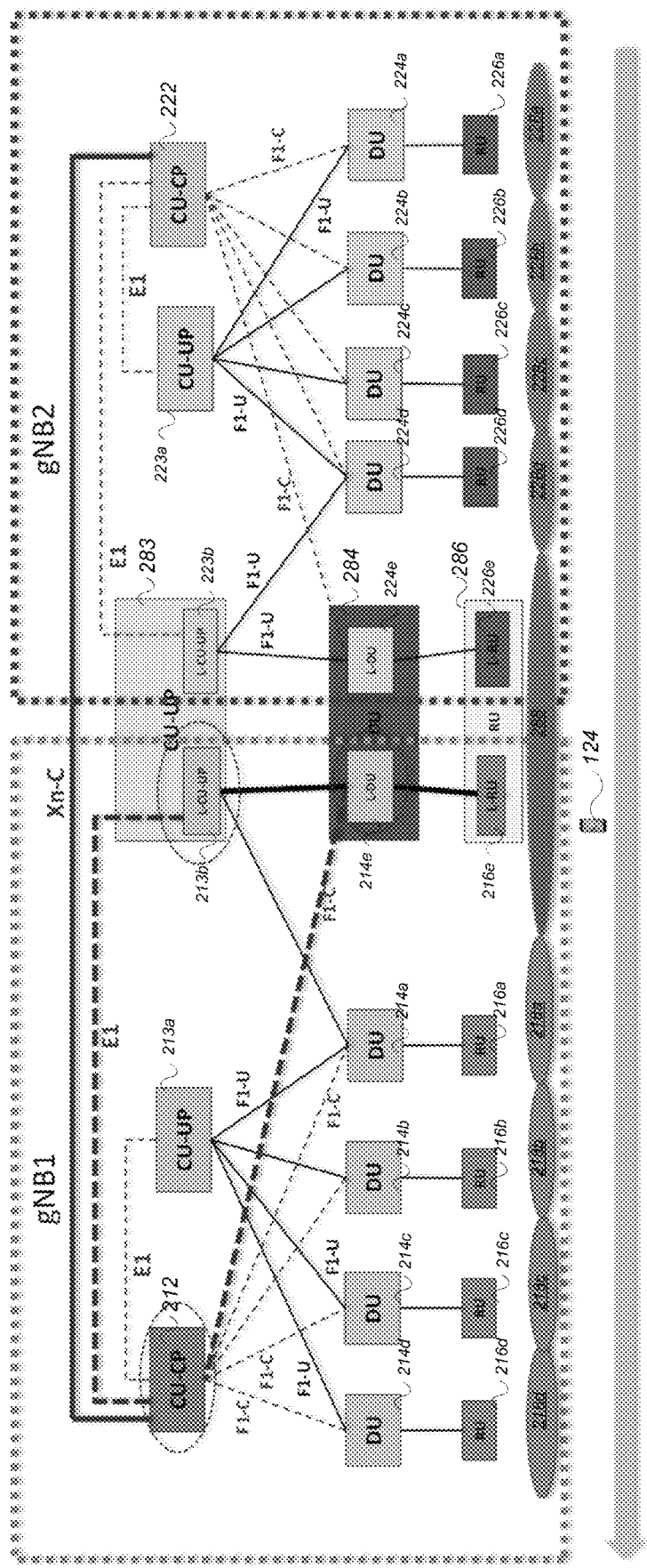

As illustrated in FIG. 2g, in executing the light inter-gNB handover, a CU-CP switch is performed to switch context information of user device 124 (e.g., transfer the context information of user device 124 via network core or other connections) from CU-CP 222 of gNB2 to CU-CP 212 of gNB1, including the use of a corresponding Xn-C interface connection. On the logical level, L-CU-UP 223b of gNB2 is switched to L-CU-UP 213b of gNB1, L-DU 224e of gNB2 is switched to L-DU 214e of gNB1, and L-RU 216e of gNB2 is switched to L-RU 216e of gNB1, including establishing and terminating corresponding E1, F1-U, and F1-C interface connections. However, because both L-CU-UP 223b and L-CU-UP 213b are implemented within physical CU-UP 283, both L-DU 224e and L-DU 214e are implemented within physical DU 284, and both L-RU 216e and L-RU 216e are implemented within physical RU 286, the logical-level switches do not require actual transfer of context data for user device 124; in other words, the context data already exists within the corresponding physical nodes, and the logical level switches can be performed by changing the association of corresponding context of user device 124 from a source logical node to a target logical node (e.g., from L-CU-UP 223b to L-CU-UP 213b, from L-DU 224e to L-DU 214e, and from L-RU 216e to L-RU 216e) by a respective physical node that implements both the source and target logical nodes. The changing of association of user device context can be achieved by the physical node in various ways, such as index change, pointer change, address change, identifier change, combination of the same or the like. As such, the light inter-gNB handover involves the change of only one physical network function element: CU-CP.

Here, the user device 124 is detected as located close to the edge of coverage area 288 and about to cross into coverage area 218a. The coverage area 218a is served by CU-CP 212, CU-UP 213a or L-CU-UP 213b, DU 214a and RU 216a of gNB1. In response to the detected location and movement of the user device 124, an intra-gNB transition handover is determined as an applicable action and the relevant handover process (e.g., relevant network function elements and their actions) is identified.

Figure 2H:
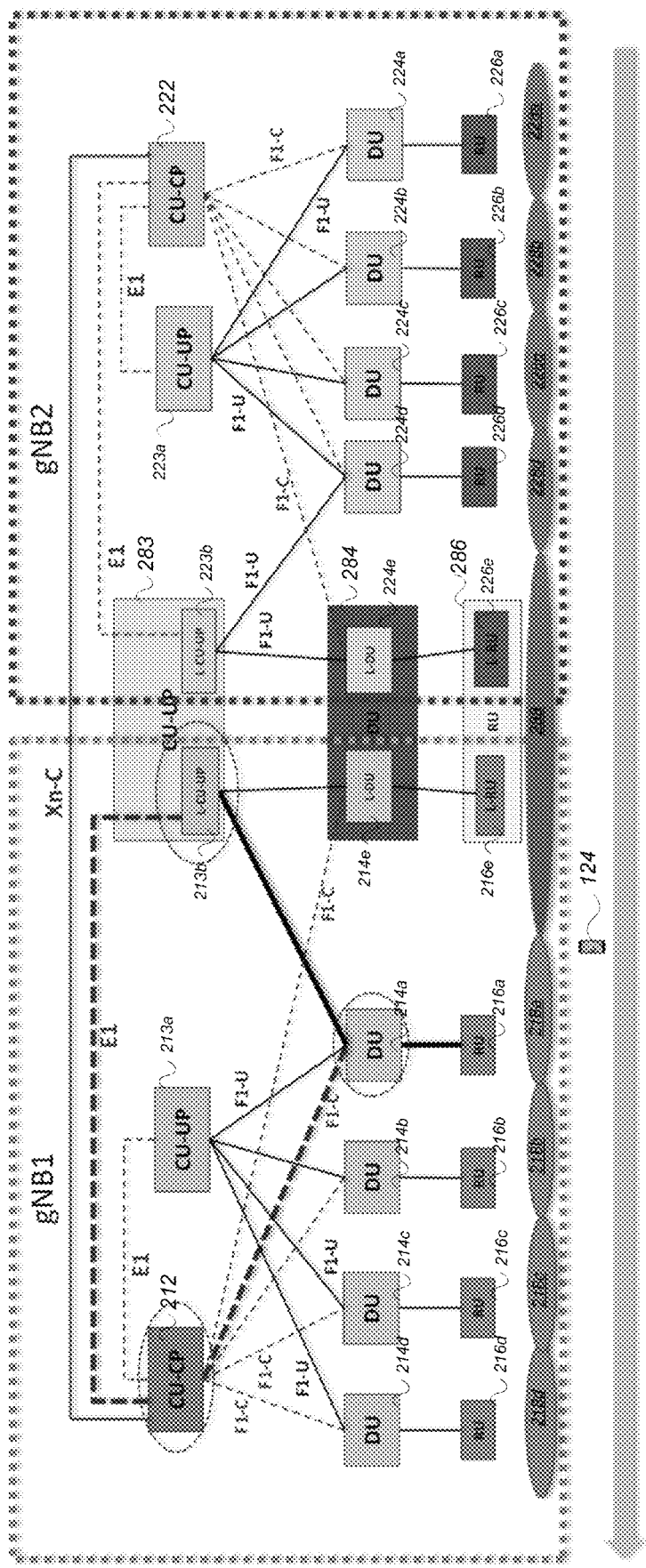

As illustrated in FIG. 2h, in executing the intra-gNB transition handover, a DU switch is performed to switch context information of user device 124 from L-DU 214e to DU 214a (physical or logical), including establishing and terminating corresponding F1-C and F1-U interface connections. Although DU 214a is connected to or otherwise shared by both CU-UP 213a and L-CU-UP 213b, and CU-CP 212 is also connected to or otherwise shared by both CU-UP 213a and L-CU-UP 213b, to ensure the handover involves the change of only one network function element (DU), no switch or context transfer is performed between L-CU-UP 213b and CU-UP 213a for the intra-gNB handover of user device 124.

Here, the user device 124 is detected as entering coverage area 218a and moving toward coverage area 218b. The coverage area 218b is served by CU-CP 212, CU-UP 213a, DU 214a and RU 216a of gNB1. In response to the detected location and movement of the user device 124, an intra-gNB post-transition handover is determined as an applicable action and the relevant handover process (e.g., relevant network function elements and their actions) is identified.

Figure 2I:
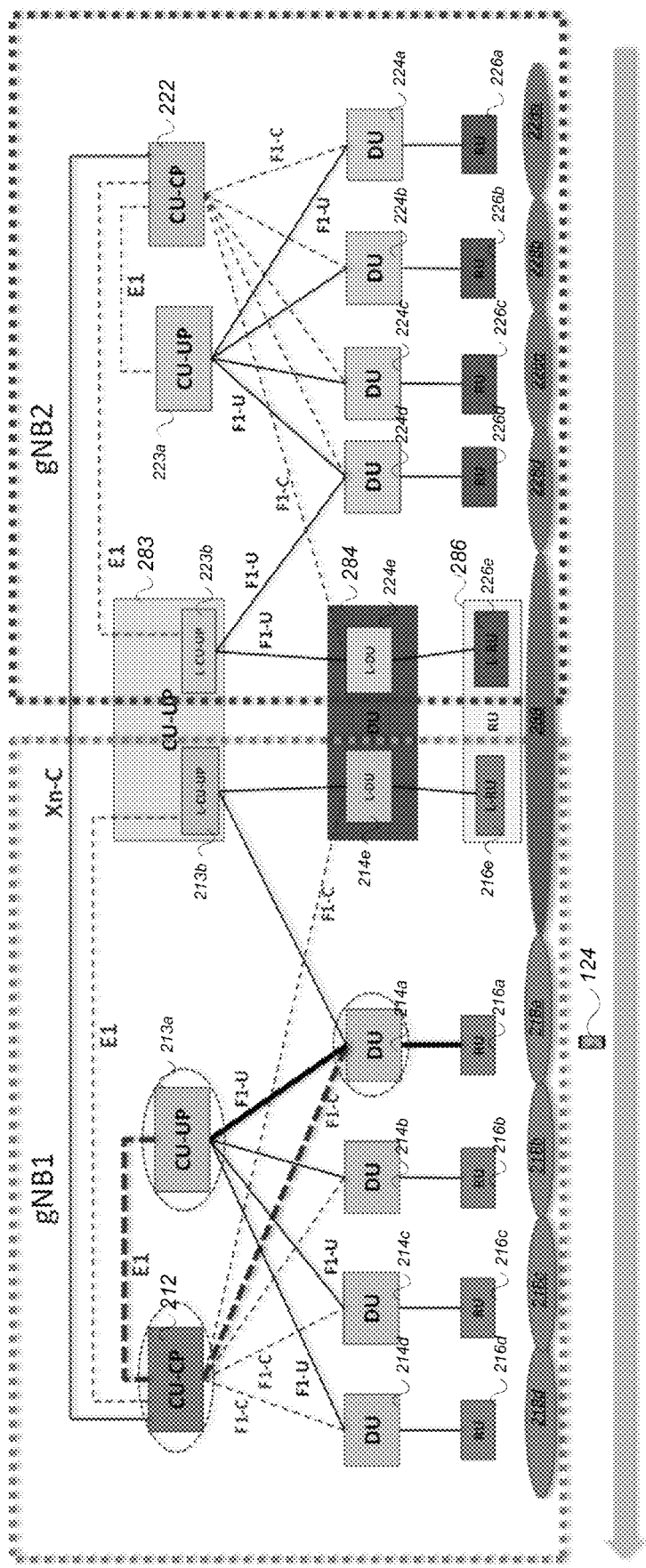

As illustrated in FIG. 2i, in executing the intra-gNB post-transition handover, a CU-UP switch is performed to switch context information of user device 124 from L-CU-UP 213b to CU-UP 213a (physical or logical), including establishing and terminating corresponding F1-U and E1 interface connections. The handover involves the change of only one network function element: CU-UP.

Here, the user device 124 is detected as located in coverage area 218a and moving toward coverage area 218b. In response to the detected location and movement of the user device 124, an intra-gNB handover is determined as an applicable action and the relevant handover process (e.g., relevant network function elements and their actions) is identified.

Figure 2J:
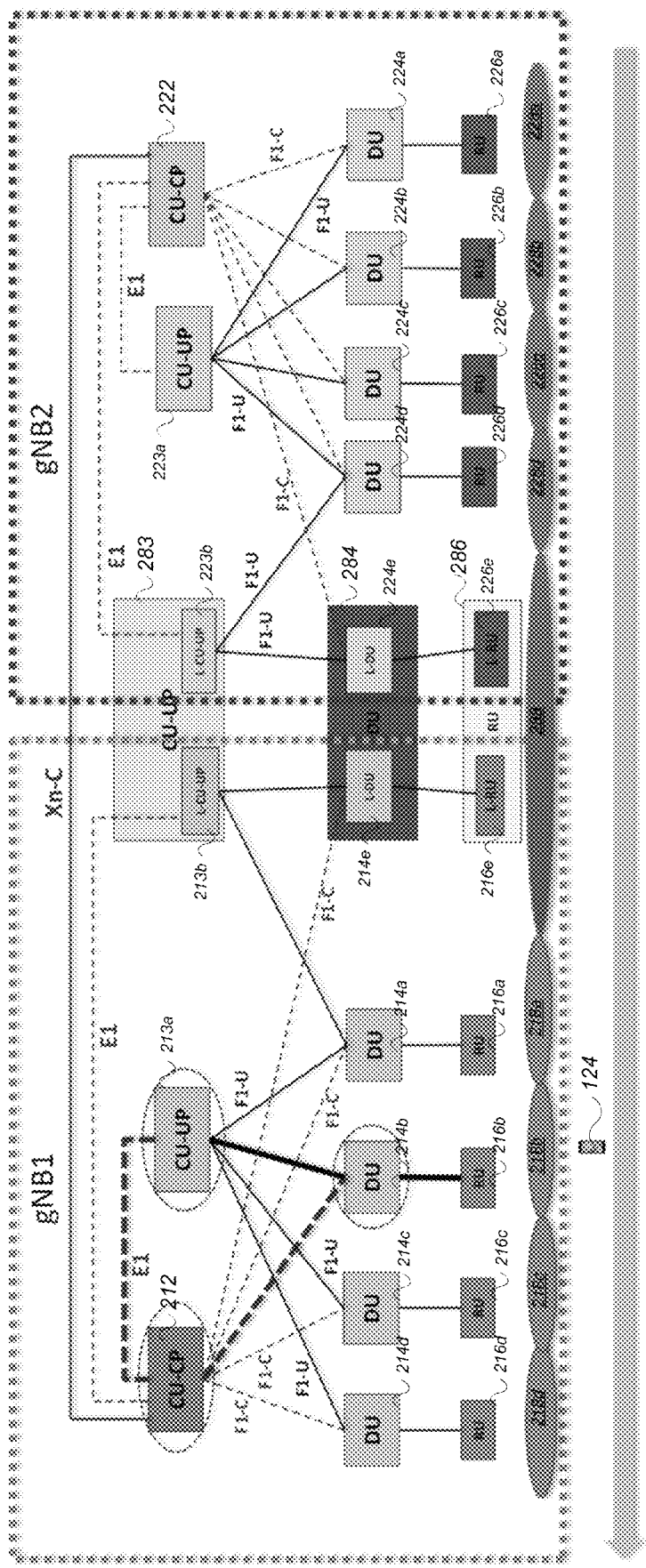

As illustrated in FIG. 2j, in executing the intra-gNB handover, a DU switch is performed to switch context information of user device 124 from DU 214a (physical or logical) to DU 214b (physical or logical), including establishing and terminating corresponding F1-C and F1-U interface connections. The handover involves the change of only one network function element: DU.

Here, the user device 124 is detected as located in coverage area 218b and moving toward coverage area 218c. The coverage area 218c is served by CU-CP 212, CU-UP 213a, DU 214c and RU 216c of gNB1. In response to the detected location and movement of the user device 124, an intra-gNB handover is determined as an applicable action and the relevant handover process (e.g., relevant network function elements and their actions) is identified.

Figure 2K:
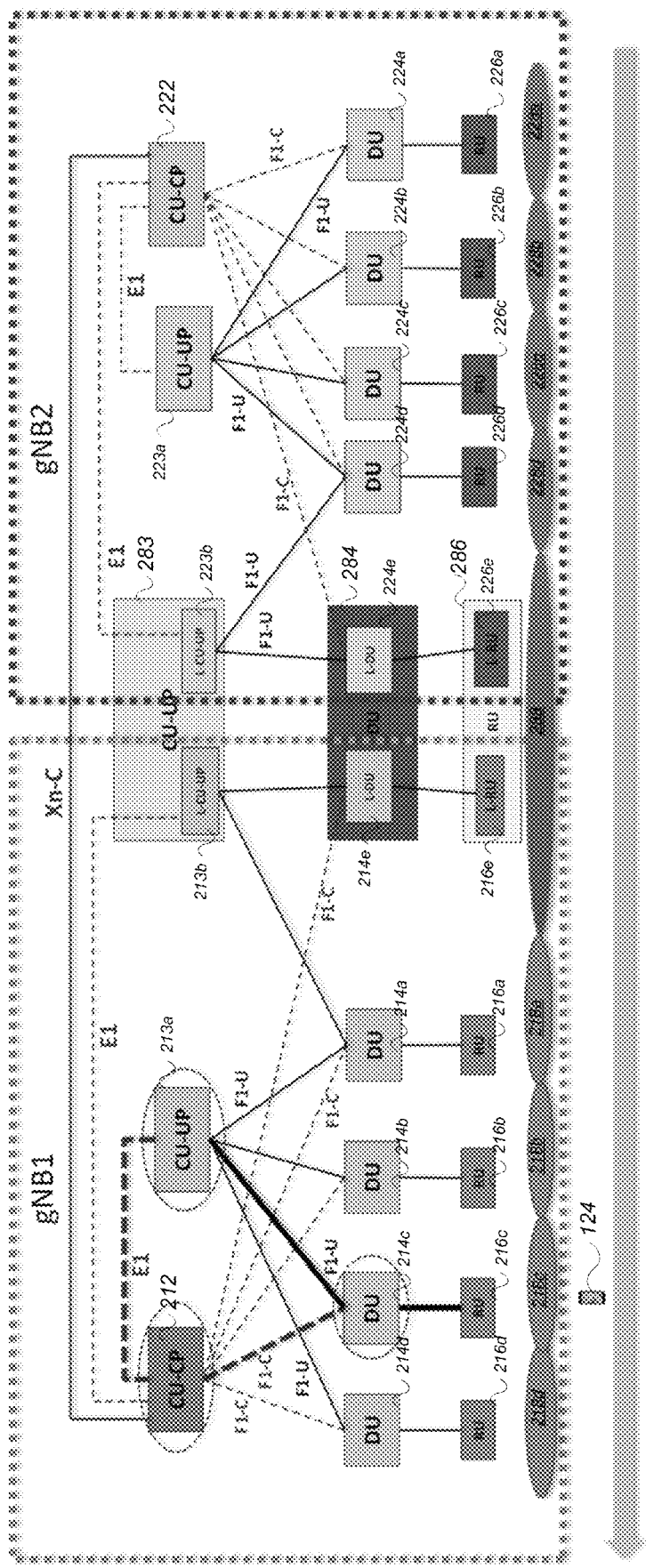

As illustrated in FIG. 2k, in executing the intra-gNB handover, a DU switch is performed to switch context information of user device 124 from DU 214b (physical or logical) to DU 214c (physical or logical), including establishing and terminating corresponding F1-C and F1-U interface connections. The handover involves the change of only one network function element: DU.

Here, the user device 124 is detected as located in coverage area 218c and moving toward coverage area 218d. The coverage area 218d is served by CU-CP 212, CU-UP 213a, DU 214d and RU 216d of gNB1. In response to the detected location and movement of the user device 124, an intra-gNB handover is determined as an applicable action and the relevant handover process (e.g., relevant network function elements and their actions) is identified.

Figure 2L:
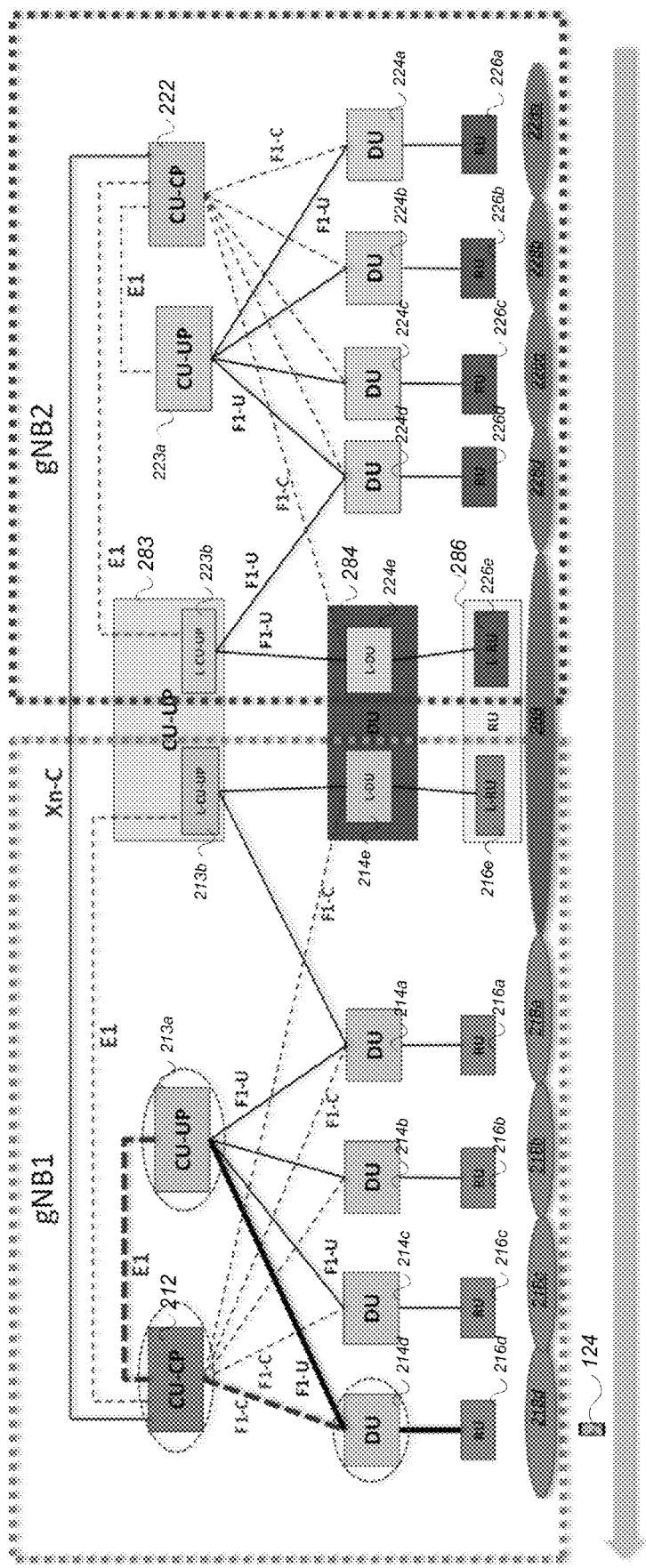

As illustrated in FIG. 2l, in executing the intra-gNB handover, a DU switch is performed to switch context information of user device 124 from DU 214c (physical or logical) to DU 214d (physical or logical), including establishing and terminating corresponding F1-C and F1-U interface connections. The handover involves the change of only one network function element: DU.

As can be seen, the presently disclosed technology enables mapping one or more logical nodes to a physical node, which allows physical node(s) to be shared between different gNBs while maintaining the principle that no logical node is shared between different gNBs. In accordance with various embodiments, at least step 2, 3, and/or 4 of the existing inter gNB handover process (see, e.g., 3GPP TS 38.401 Clause 8.9.4) can be simplified.

Figure 3:
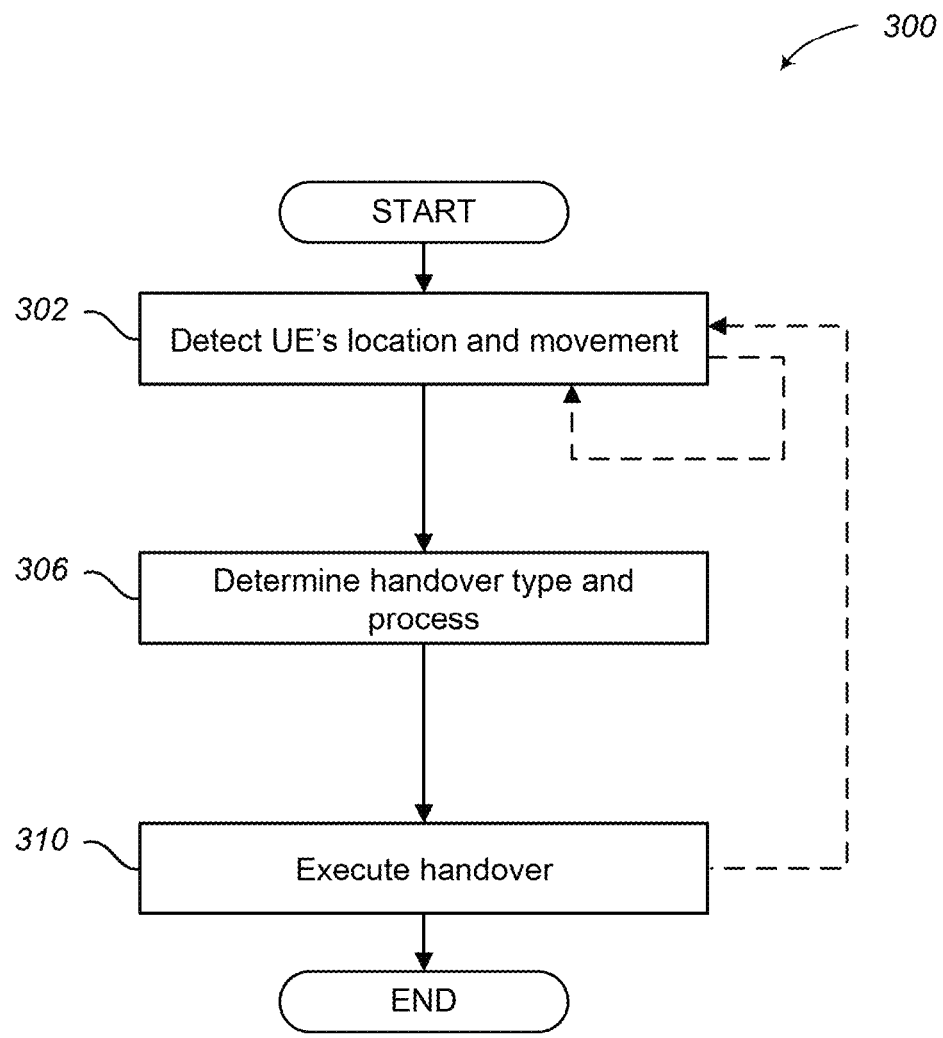
FIG. 3 is a flow diagram illustrating an example process for efficient handover in accordance with one or more embodiments of the presently disclosed technology.

FIG. 3 is a flow diagram illustrating an example process 300 for efficient handover in accordance with one or more embodiments of the presently disclosed technology. In various embodiments, the process 300 is performed in real time, and at least some part of the process 300 is performed in a transparent manner to a user of user device. Illustratively, at least some part of the process 300 can be implemented by the handover service 102, one or more user devices 124, or an applicable component of network core in accordance with the environment 100 of FIG. 1.

The process 300 starts at block 302, which includes detecting the location and/or movement of a user device 124. As describe above with reference to FIGS. 2a-2l, the user device 124 can be detected relative to one or more coverage areas associated with one or more gNBs or other base stations. In some embodiments, the process 300 proceeds back to block 302 to further detect the location and/or movement of the user device 124, e.g., based on updates or to confirm at least some part of a prior detection result.

In some embodiments, the process 300 proceeds to block 306, which includes determining a handover type and/or process based on the detection performed at block 302. As described above with reference to FIGS. 2a-2l, handover types can include intra-gNB handover, intra-gNB pre-transition handover, intra-gNB transition handover, light intergNB handover, intra-gNB post-transition handover, or others. The relevant process for the determined handover type can be identified.

In some embodiments, the process 300 proceeds to block 310, which includes executing the handover in accordance with the handover type and/or process determined at block 306. As described above with reference to FIGS. 2a-2l, the execution can include switches of physical or logical network function elements. In some embodiments, the switches involve change of only one network function element, which can be physical or logical depending on the type of handover involved. In some embodiments, the handover does not require context data transfer when logical-level switch is performed. As such, significant computational or communication resources can be saved while handover efficiency and performance is improved.

In some embodiments, the process 300 proceeds back to block 302 to further detect the location and/or movement of the user device 124.

Figure 4:
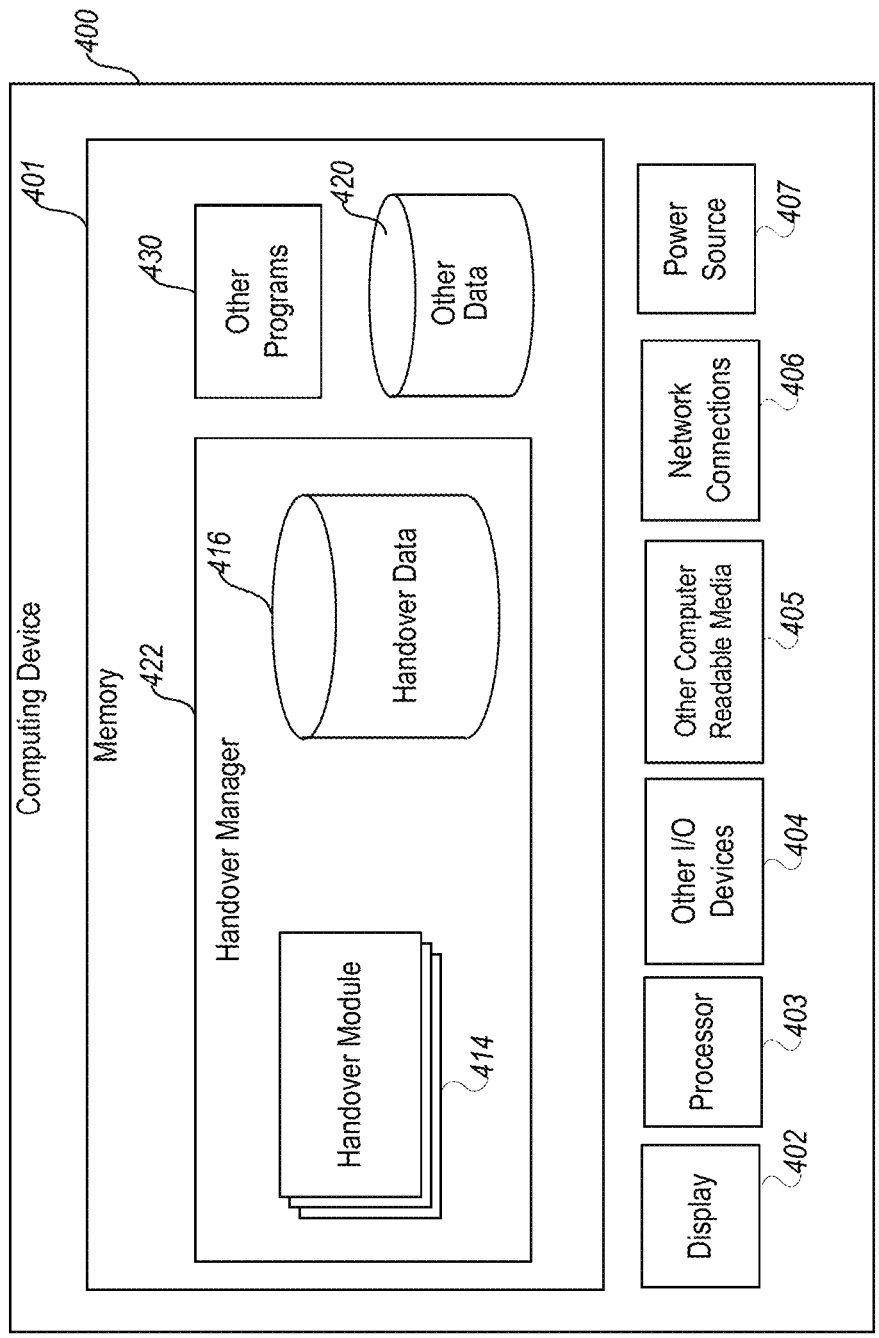
FIG. 4 is a block diagram illustrating elements of an example computing device utilized in accordance with some embodiments of the techniques described herein.

FIG. 4 is a block diagram illustrating elements of an example computing device 400 utilized in accordance with some embodiments of the techniques described herein. Illustratively, the computing device 400 corresponds to the handover service 102, an element or component of the communication network 110, a user device 124, or at least a part thereof.

In some embodiments, one or more general purpose or special purpose computing systems or devices may be used to implement the computing device 400. In addition, in some embodiments, the computing device 400 may comprise one or more distinct computing systems or devices, and may span distributed locations. Furthermore, each block shown in FIG. 4 may represent one or more such blocks as appropriate to a specific embodiment or may be combined with other blocks. Also, the handover manager 422 may be implemented in software, hardware, firmware, or in some combination to achieve the capabilities described herein.

As shown, the computing device 400 comprises a computer memory ("memory") 401, a display 402 (including, but not limited to a light emitting diode (LED) panel, cathode ray tube (CRT) display, liquid crystal display (LCD), touch screen display, projector, etc.), one or more Central Processing Units (CPU) or other processors 403, Input/Output (I/O) devices 404 (e.g., keyboard, mouse, RF or infrared receiver, universal serial bus (USB) ports, High-Definition Multimedia Interface (HDMI) ports, other communication ports, and the like), other computer-readable media 405, network connections 406, a power source (or interface to a power source) 407. The handover manager 422 is shown residing in memory 401. In other embodiments, some portion of the contents and some, or all, of the components of the handover manager 422 may be stored on and/or transmitted over the other computer-readable media 405. The components of the computing device 400 and handover manager 422 can execute on one or more processors 403 and implement applicable functions described herein. In some embodiments, the handover manager 422 may operate as, be part of, or work in conjunction and/or cooperation with other software applications stored in memory 401 or on various other computing devices. In some embodiments, the handover manager 422 also facilitates communication with peripheral devices via the I/O devices 404, or with another device or system via the network connections 406.

The one or more handover modules 424 is configured to perform actions related, directly or indirectly, to handover determining and execution as described herein. In some embodiments, the handover module(s) 424 stores, retrieves, or otherwise accesses at least some handover-related data on some portion of the handover data storage 416 or other data storage internal or external to the computing device 400. In various embodiments, at least some of the handover modules 424 may be implemented in software or hardware.

Other code or programs 430 (e.g., further data processing modules, communication modules, a Web server, and the like), and potentially other data repositories, such as data repository 420 for storing other data, may also reside in the memory 401, and can execute on one or more processors 403. Of note, one or more of the components in FIG. 4 may or may not be present in any specific implementation. For example, some embodiments may not provide other computer readable media 405 or a display 402.

In some embodiments, the computing device 400 and handover 422 include API(s) that provides programmatic access to add, remove, or change one or more functions of the computing device 400. In some embodiments, components/modules of the computing device 400 and handover manager 422 are implemented using standard programming techniques. For example, the handover manager 422 may be implemented as an executable running on the processor(s) 403, along with one or more static or dynamic libraries. In other embodiments, the computing device 400 and handover manager 422 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the computing device 400 to perform the functions of the handover manager 422. In some embodiments, instructions cause the one or more processors 403 or some other processor(s), such as an I/O controller/processor, to perform at least some functions described herein.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs or other processors. Some embodiments may execute concurrently and asynchronously, and communicate using message passing techniques. Equivalent synchronous embodiments are also supported by a handover manager 422 implementation. Also, other functions could be implemented and/or performed by each component/module, and in different orders, and by different components/modules, yet still achieve the functions of the computing device 400 and handover manager 422.

In addition, programming interfaces to the data stored as part of the computing device 400 and handover manager 422, can be available by standard mechanisms such as through C, C++, C#, and Java APIs; libraries for accessing files, databases, or other data repositories; scripting languages such as XML; or Web servers, FTP servers, NFS file servers, or other types of servers providing access to stored data. The handover data storage 416 and data repository 420 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the handover manager 422.

Furthermore, in some embodiments, some or all of the components of the computing device 400 and handover manager 422 may be implemented or provided in other manners, such as at least partially in firmware and/or hardware, including, but not limited to one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use, or provide the contents to perform, at least some of the described techniques.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer-implemented method for efficient handover in a Fifth Generation (5G) communications network, the method comprising:

responsive to detecting that a user device is located in a geographic area with overlapping 5G coverage from a first Next Generation NodeB (gNB) and a second gNB and that the user device is moving away from the first gNB's coverage toward the second gNB's coverage, determining to perform a light inter-gNB handover of the user device; and causing execution of the light inter-gNB handover by at least causing a physical switch from a physical Central Unit Control Plane (CU-CP) of the first gNB to a physical CU-CP of the second gNB, a logical switch from a logical Central Unit User Plane (CU-UP) of the first gNB to a logical CU-UP of the second gNB, a logical switch from a logical Distributed Unit (DU) of the first gNB to a logical DU of the second gBN, and a logical switch from a logical Remote Unit (RU) of the first gNB to a logical RU of the second gBN, wherein the logical switches are performed without transfer of context data associated with the user device.

2. The method of claim 1, wherein both the logical CU-UP of the first gNB and the logical CU-UP of the second gNB are implemented within a physical CU-UP, both the logical DU of the first gNB and the logical DU of the second gNB are implemented within a physical DU, and both the logical RU of the first gNB and the logical RU of the second gNB are implemented within a physical RU.

3. The method of claim 2, wherein the physical CU-UP stores at least a portion of the context data associated with the user device, the physical DU stores at least a portion of the context data associated with the user device, and the physical RU stores at least a portion of the context data associated with the user device.

4. The method of claim 1, wherein the logical switch from the logical CU-UP of the first gNB to the logical CU-UP of the second gNB is performed, at least in part, by changing an association of at least a portion of the context information associated with the user device from the logical CU-UP of the first gNB to the logical CU-UP of the second gNB, the logical switch from the logical DU of the first gNB to the logical DU of the second gNB is performed, at least in part, by changing an association of at least a portion of the context information associated with the user device from the logical DU of the first gNB to the logical DU of the second gNB, and the logical switch from the logical RU of the first gNB to the logical RU of the second gNB is performed, at least in part, by changing an association of at least a portion of the context information associated with the user device from the logical RU of the first gNB to the logical RU of the second gNB.

5. The method of claim 4, wherein the changing of associations is implemented by at least one of and index change, pointer change, address change, or identifier change.

6. The method of claim 1, wherein prior to causing execution of the light inter-gNB handover, a DU switch is performed to transfer at least a portion of the context information associated with the user device from another physical DU of the first gNB to the logical DU of the first gNB.

7. The method of claim 1, wherein prior to causing execution of the light inter-gNB handover, a CU-UP switch is performed to transfer at least a portion of the context information associated with the user device from another physical CU-UP of the first gNB to the logical CU-UP of the first gNB.

8. A system for efficient handover in a Fifth Generation (5G) communications network, comprising:

at least one memory that stores computer executable instructions; and at least one processor that executes the computer executable instructions to cause actions to be performed, the actions comprising:

responsive to detecting that a user device is located in a geographic area with overlapping 5G coverage from a first Next Generation NodeB (gNB) and a second gNB and that the user device is moving away from the first gNB's coverage toward the second gNB's coverage, determining to perform a light inter-gNB handover of the user device; and causing execution of the light inter-gNB handover by at least causing a physical switch from a physical Central Unit Control Plane (CU-CP) of the first gNB to a physical CU-CP of the second gNB and at least one of: (a) a logical switch from a logical Central Unit User Plane (CU-UP) of the first gNB to a logical CU-UP of the second gNB or (b) a logical switch from a logical Distributed Unit (DU) of the first gNB to a logical DU of the second gBN, wherein the logical switches are performed without transfer of context data associated with the user device.

9. The system of claim 8, wherein both the logical CU-UP of the first gNB and the logical CU-UP of the second gNB are implemented within a physical CU-UP, and both the logical DU of the first gNB and the logical DU of the second gNB are implemented within a physical DU.

10. The system of claim 9, wherein the physical CU-UP stores at least a first portion of the context data associated with the user device, and the physical DU stores at least a second portion of the context data associated with the user device.

11. The system of claim 10, wherein the at least one of the logical switches is performed by at least changing an association of at least the first portion of the context information associated with the user device within the physical CU-UP or changing an association of at least the second portion of the context information associated with the user device within the physical DU.

12. The system of claim 11, wherein at least one of the changing of associations is implemented by at least one of an index change, pointer change, address change, or identifier change.

13. The system of claim 8, wherein subsequent to causing execution of the light inter-gNB handover, a DU switch is performed to transfer at least a portion of the context information associated with the user device from the logical DU of the second gNB to another physical DU of the second gNB.

14. The system of claim 8, wherein subsequent to causing execution of the light inter-gNB handover, a CU-UP switch is performed to transfer at least a portion of the context information associated with the user device from the logical CU-UP of the second gNB to another physical CU-UP of the second gNB.

15. A non-transitory computer-readable medium storing contents that, when executed by one or more processors, cause the one or more processors to perform actions comprising:

responsive to detecting that a user device is located in a geographic area with overlapping 5G coverage from a first Next Generation NodeB (gNB) and a second gNB and that the user device is moving away from the first gNB's coverage toward the second gNB's coverage, determining to perform a light inter-gNB handover of the user device; and causing execution of the light inter-gNB handover by at least causing a physical switch from a physical Central Unit Control Plane (CU-CP) of the first gNB to a physical CU-CP of the second gNB and at least one of: (a) a logical switch from a logical Central Unit User Plane (CU-UP) of the first gNB to a logical CU-UP of the second gNB or (b) a logical switch from a logical Distributed Unit (DU) of the first gNB to a logical DU of the second gBN, wherein the logical switches are performed without transfer of context data associated with the user device.

16. The computer-readable medium of claim 15, wherein both the logical CU-UP of the first gNB and the logical CU-UP of the second gNB are implemented within a physical CU-UP, and both the logical DU of the first gNB and the logical DU of the second gNB are implemented within a physical DU.

17. The computer-readable medium of claim 16, wherein the physical CU-UP is shared between two or more gNBs and the physical DU is shared between two or more gNBs.

18. The computer-readable medium of claim 16, wherein the at least one of the logical switches is performed by at least changing an association of at least the first portion of the context information associated with the user device within the physical CU-UP or changing an association of at least the second portion of the context information associated with the user device within the physical DU.

19. The computer-readable medium of claim 15, wherein subsequent to causing execution of the light inter-gNB handover, at least a portion of the context information associated with the user device is transferred from the logical DU of the second gNB to another physical DU of the second gNB.

20. The computer-readable medium of claim 15, wherein prior to causing execution of the light inter-gNB handover, at least a portion of the context information associated with the user device is transferred from another physical CU-UP of the first gNB to the logical CU-UP of the first gNB.

21. The method of claim 1, wherein at least one of the logical CU-UP of the first gNB or the logical CU-UP of the second gNB is implemented within a physical CU-UP.

22. The method of claim 1, wherein at least one of the logical DU of the first gNB or the logical DU of the second gNB is implemented within a physical DU.

* * * * *

UNITED STATES PATENT AND TRADEMARK OFFICE
CERTIFICATE OF CORRECTION

PATENT NO. : 12,395,909 B2
APPLICATION NO. : 18/188342
DATED : August 19, 2025
INVENTOR(S) : Mehdi Alasti et al.

It is certified that error appears in the above-identified patent and that said Letters Patent is hereby corrected as shown below:

On the Title Page

Item (57) Abstract, Line 14:
"gBN, and a" should read: --gNB, and a--.

Item (57) Abstract, Line 15:
"second gBN," should read: --second gNB,--.

In the Claims

Column 14, Claim 1, Line 13:
"second gBN," should read: --second gNB,--.

Column 14, Claim 1, Line 15:
"second gBN," should read: --second gNB,--.

Column 15, Claim 8, Line 20:
"second gBN," should read: --second gNB,--.

Column 16, Claim 15, Line 19:
"second gBN," should read: --second gNB,--.

Signed and Sealed this
Fourteenth Day of October, 2025

John A. Squires
*Director of the United States Patent and Trademark Office*